United States Patent [19]
Cogliano

[11] 3,946,905
[45] Mar. 30, 1976

[54] COLLAPSIBLE PLASTIC TUBES
[75] Inventor: Joseph A. Cogliano, Baltimore, Md.
[73] Assignee: W. R. Grace & Co., New York, N.Y.
[22] Filed: July 24, 1975
[21] Appl. No.: 599,247

Related U.S. Application Data
[62] Division of Ser. No. 453,314, March 21, 1974.

[52] U.S. Cl. ................................. 222/107
[51] Int. Cl.² .............................. B65D 35/08
[58] Field of Search ........... 222/107, 215; 138/119, 138/137

[56] References Cited
UNITED STATES PATENTS

| | | | |
|---|---|---|---|
| 2,430,046 | 11/1947 | Dreyfus | 138/128 R |
| 2,525,272 | 10/1950 | Rhoton | 138/118 X |
| 2,643,027 | 6/1953 | Fink | 138/119 X |
| 3,024,813 | 3/1962 | Sear et al. | 138/137 |
| 3,186,600 | 6/1965 | Guignard | 222/107 |
| 3,381,717 | 5/1968 | Turrel | 138/137 |
| 3,382,121 | 5/1968 | Sherlock | 138/118 X |
| 3,491,799 | 1/1970 | Foll | 138/137 |
| 3,600,487 | 8/1971 | Zavasnik | 138/137 X |
| 3,624,800 | 11/1971 | Swick | 138/118 X |
| 3,741,253 | 6/1973 | Brax et al. | 138/137 |
| 3,847,721 | 11/1974 | Evans | 161/108 |

*Primary Examiner*—Allen N. Knowles
*Assistant Examiner*—Hadd Lane
*Attorney, Agent, or Firm*—Elton Fisher

[57] ABSTRACT

A collapsible plastic tube comprising a laminate of an inner ply and an outer ply, the inner ply being a heat flowable nonoriented thermoplastic polymer and the outer ply being a heat flowable, oriented, shrunk thermoplastic polymer.

4 Claims, 16 Drawing Figures

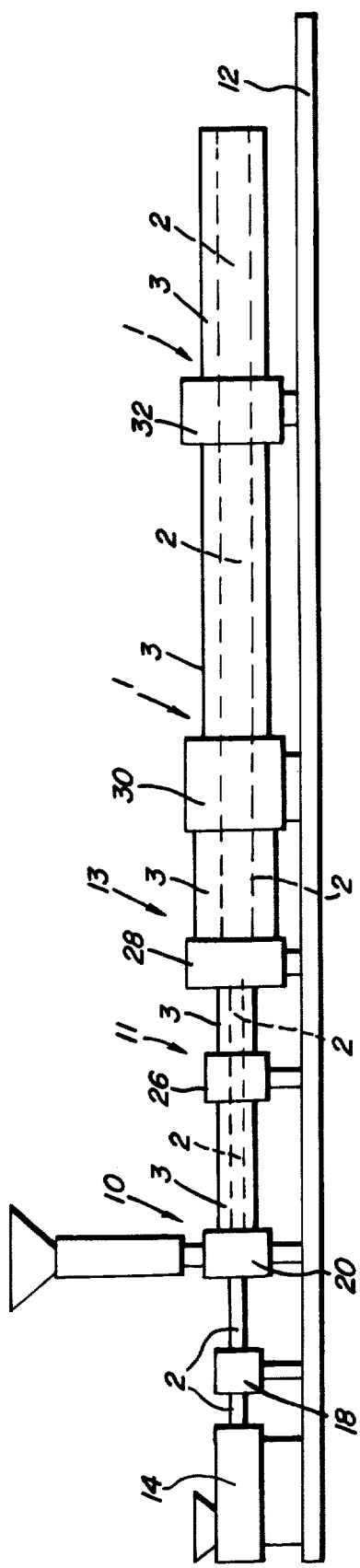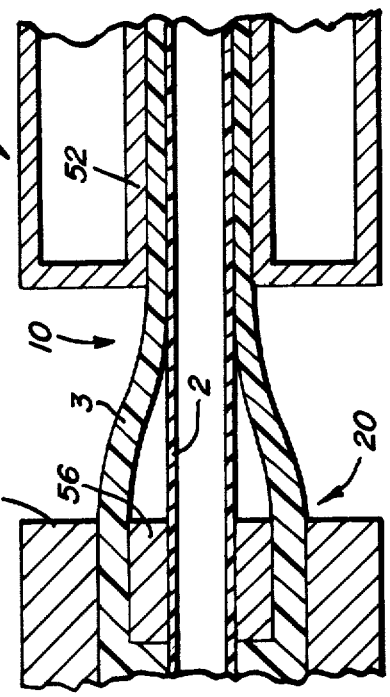

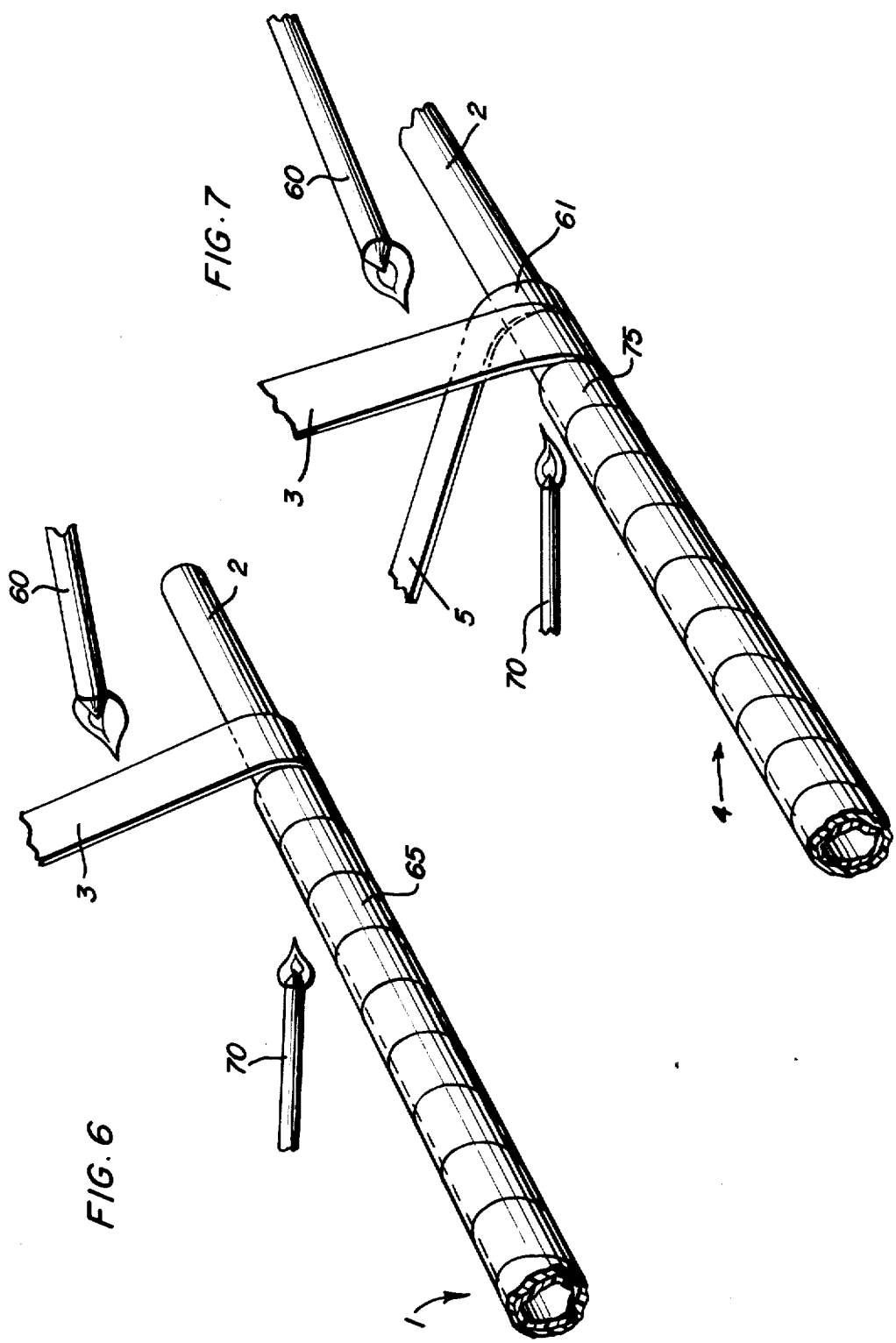

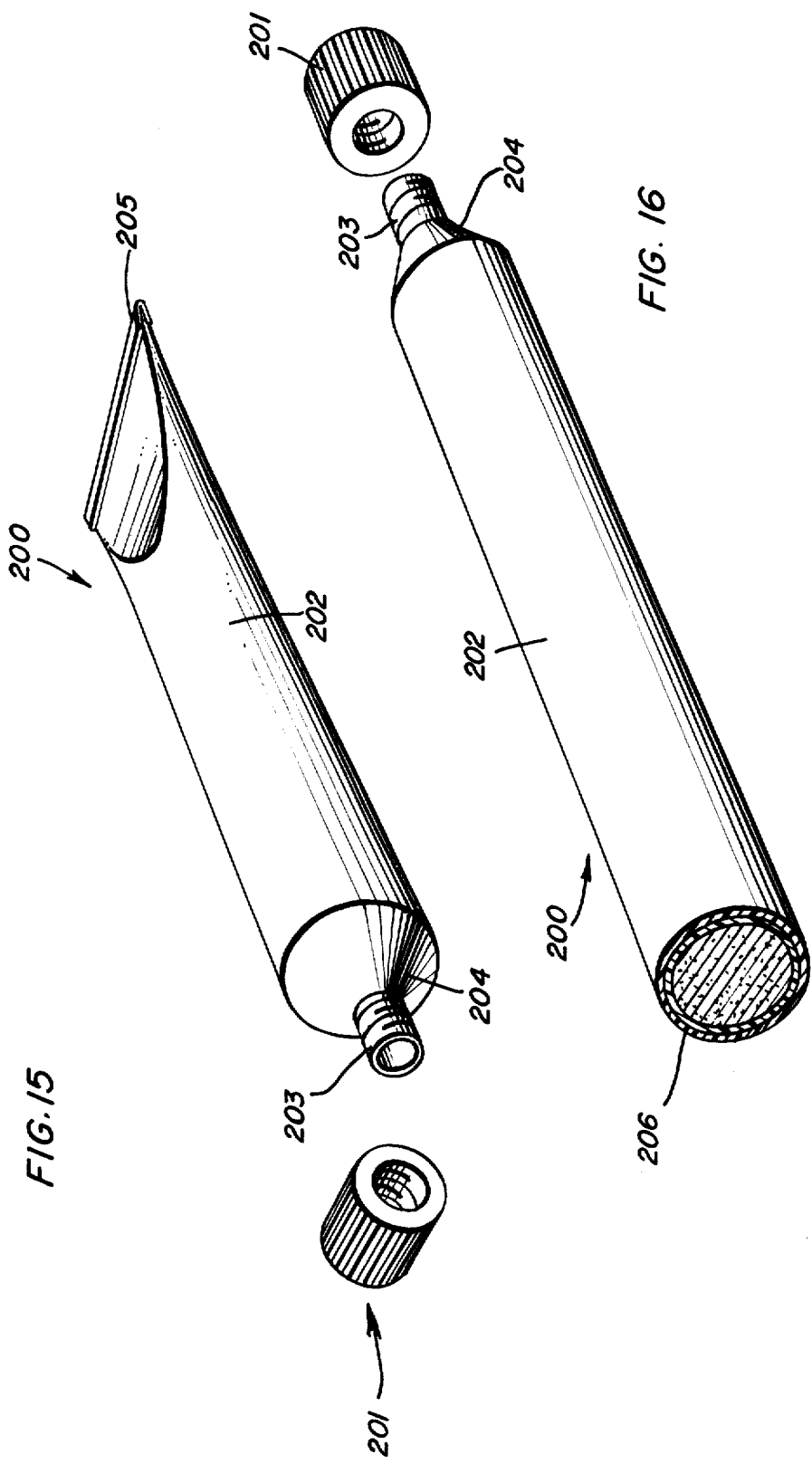

COLLAPSIBLE PLASTIC TUBES

This is a division of application Ser. No. 453,314 filed Mar. 21, 1974.

BACKGROUND OF THE INVENTION

This invention is directed to a collapsible plastic tube excellently adapted for preparing collapsible packaging and dispensing tubes for foodstuff such as mustard paste, ketchup, chutney, mayonnaise, and the like. The collapsible plastic tube of this invention is also excellently adapted for making packaging and dispensing tubes for items such as toothpaste, shaving cream, lubricating greases, medicinal pastes, ointments, and the like. Other materials which can be packaged in said collapsible tube and other uses for said tube will be readily apparent to those skilled in the art.

It is well known that when a portion of a material such as mustard paste, ketchup, shaving cream, or the like is squeezed out of a metal (e.g., tin or aluminum) packaging and dispensing tube, the tube remains collapsed and does not reexpand and does not suck air into itself (the tube) when pressure thereon is released. It is also well known that, when a portion of ketchup (or the like) is squeezed from a conventional plastic packaging and dispensing tube, the tube reexapnds when the squeezing pressure is released. On reexpanding air is sucked into the plastic tube. The thus included air is expelled along with the ketchup when a further portion of ketchup is squeezed from the tube. Expelling such air along with the ketchup can cause the ketchup to "spray" onto one's clothing and/or onto other people. Also, included air can cause contamination and oxidation of material in the tube with consequent deterioration.

Dispensing and packaging tubes (such as toothpaste tubes, ketchup tubes, and the like) made from the collapsible tube of this invention remain collapsed and neither reexpand nor draw in air when; (a) a portion of material (e.g., ketchup, chutney, toothpaste, shaving cream, or the like) contained therein is dispensed therefrom by squeezing with gentle pressure; and (b) the squeezing pressure is released. Hence said collapsible tube is an excellent replacement for metal tubes for packaging items such as ketchup, mustard paste, chutney, shaving cream, toothpaste, and the like.

U.S. Pat. No. 3,491,799 (Foll, 138/137) and U.S. Pat. No. 3,600,487 (Zavasnik, 264/89) teach methods for preparing laminated plastic tubes.

SUMMARY

In summary, this invention is directed to a collapsible plastic tube comprising a laminate of an inner ply (2 of FIG. 1) and an outer ply (3 of FIG. 1) the inner ply being a heat flowable, nonoriented, nonshrunk thermoplastic polymer and the outer ply being a heat flowable, oriented, shrunk thermoplastic polymer.

BRIEF DESCRIPTION OF THE DRAWINGS

FIG. 4 is a schematic representation of an apparatus and method for making the collapsible plastic tube shown in FIG. 1.

FIG. 5 is a detailed view of the die face and the initial section of the sizing zone of FIG. 4.

FIG. 6 is a schematic diagram of an alternative method for making the collapsible tube of FIG. 1.

FIG. 7 is a schematic diagram of a method for making the collapsible plastic tube of FIG. 2.

FIG. 9 illustrates an embodiment of the instant invention in which the collapsible tube is creased (110) (as in FIG. 10) to further facilitate its collapsing as its content is removed.

FIG. 15 shows a collapsible packaging and dispensing tube of my invention with the filling end heat sealed (205).

FIG. 16 shows a collapsible packaging and dispensing tube of my invention before the filling end 206 has been heat sealed.

DESCRIPTION OF PREFERRED EMBODIMENTS

In preferred embodiments of the collapsible tube of the above Summary:

1. The extrudable (heat flowable) nonoriented plastic comprising the inner ply is polyethylene, cellulose acetate, saran, polyvinyl acetate, ethylene-vinyl acetate copolymer, or polyvinyl chloride.

2. The heat flowable (extrudable) oriented shrunk plastic comprising the outer ply is polyethylene, polypropylene, polyester, polystyrene, polyvinyl chloride, Pliofilm (rubber hydrochloride) nylon, ethylenevinyl alcohol copolymer, or an acrylonitrile copolymer.

3. The inner ply and the outer ply are bonded together.

4. The inner ply and the outer ply are bonded together with a bonding agent which is preferably an ionomer (e.g., Surlyn), polyurethan, atactic polypropylene, vinyl acetate, epoxy resin, or polystyrene, the bonding agent having a thickness of 0.05–5 mils (more preferably 0.05–12 mils).

5. The inner ply has a thickness of 2–20 mils (more preferably 2–10 mils).

6. The outer ply has a thickness of 2–20 mils (more preferably 2–10 mils).

7. The inner ply is constructed of polyethylene or polypropylene.

8. The outer ply is constructed of nylon or polypropylene.

Figure 9:
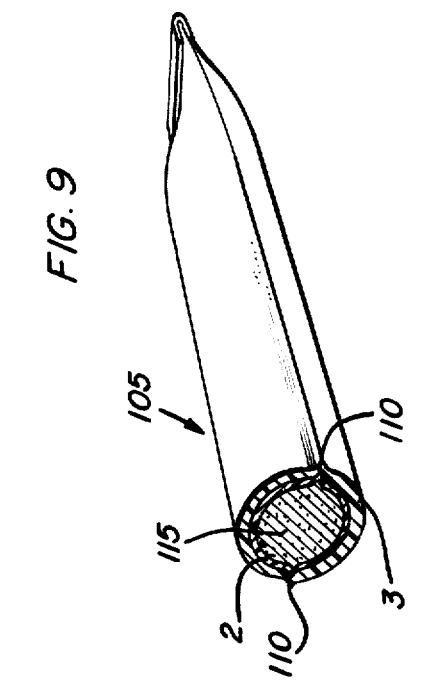
FIG. 9 is a toothpaste container 105 with the top portion cut away. Said container is filled with toothpaste 115. Said container 105 is fabricated from a collapsible tube of the general type represented by FIG. 1. However.
Figure 11:
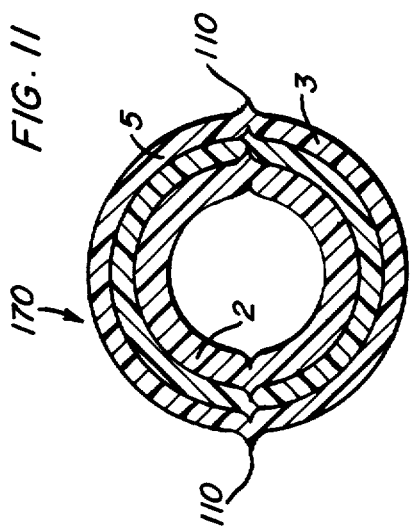
FIG. 11 is a cross section of the collapsible tube of FIG. 2 in which said tube is creased (110) to facilitate collapsing.
Figure 10:
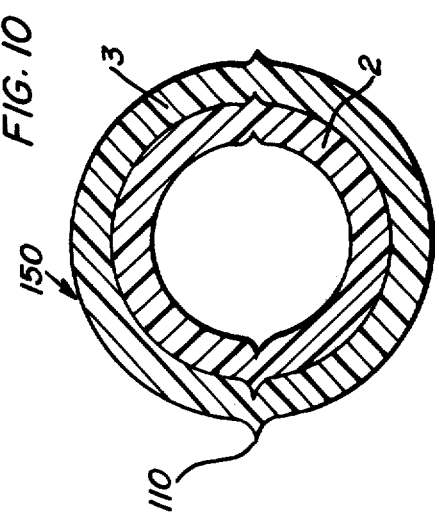
FIG. 10 is a cross section of the collapsible tube of FIG. 1 in which said tube is creased (110) to facilitate collapsing.

In another preferred embodiment of the collapsible plastic tube of the above Summary, said tube is creased longitudinally as shown at 110 in FIGS. 9 and 10 to facilitate collapsing when content is removed from a tubular container (dispensing tube) made from said collapsible tube. It is preferred that there be two creases about 180° from each other as shown in FIG. 10. This embodiment, as shown by FIG. 11, is also applicable where a bonding agent is used to bond the inner and outer plys together.

In a preferred embodiment ("Embodiment A") this invention is directed to a collapsible plastic tube comprising a heat flowable oriented plastic tube having an unshrunk (nonshrunk) inner portion and a shrunk outer portion.

Figure 12:
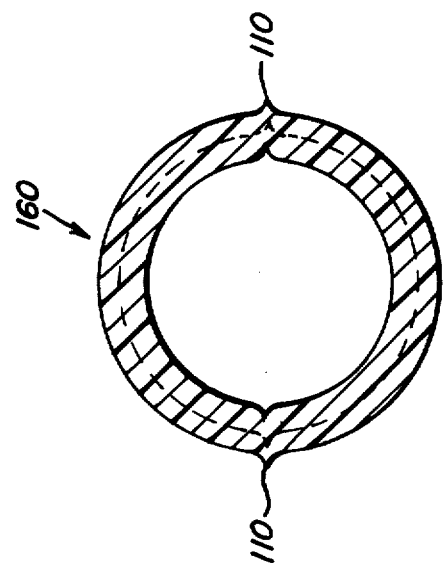
FIG. 12 is a cross section of the collapsible tube of FIG. 3 in which said tube is creased (110) to facilitate collapsing.

In especially preferred embodiments of the collapsible plastic tube of Embodiment A:

1. The tube has a thickness of 5–40 mils (more preferably 5–15 mils).
2. The tube is constructed of polypropylene or nylon.
3. The inner portion of the collapsible tube comprises 10–70% (more preferably 40–60%) of said tube.
4. Said tube is creased longitudinally (see 110 of FIG. 12) to facilitate collapsing when content is removed from a tubular container (dispensing tube) made from said collapsible tube. It is preferred that there be two creases about 180° from each other as shown in FIG. 12.

Figure 8:
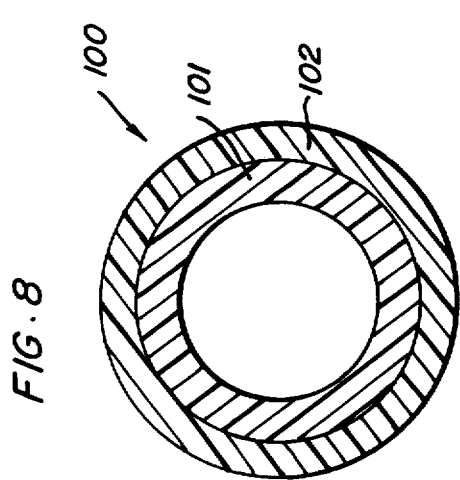
FIG. 8 is a cross section of a collapsible tube 100 comprising a tube 101 made of a heat flowable thermoplastic within a tight fitting elastomeric sleeve 102.

In another preferred embodiment ("Embodiment B") this invention is directed to a collapsible plastic assembly comprising a heat flowable thermoplastic tube within a tight fitting elastomeric plastic sleeve. See FIG. 8. Said assembly can be prepared by hand or with conventional sleeve fitting apparatus. I generally prefer to cut the plastic tube into short lengths (e.g., 3 inches to 8 inches) before applying the sleeve. Alternative the sleeve can be applied to a dispensing tube fabricated from the plastic tube — i.e., the sleeve can be applied to a dispensing tube which was prepared by heat sealing a cappable end (e.g., 204 of FIG. 15) onto one end of a short section of the plastic tube.

In general it is preferred that the plastic tube of said collapsible plastic assembly be constructed of polyethylene or polypropylene; however, other operable plastics (polymers) will, because of my disclosure, be readily apparent to those skilled in the art.

I generally prefer to construct the elastomeric plastic sleeve of natural rubber, a styrene-butadiene copolymer (e.g., GR-S), an acrylonitrile-butadiene copolymer (e.g., NBR), polyisoprene (e.g., high-cis-1,4-polyisoprene), polybutadiene, or a copolymer of isobutylene and isoprene, e.g., the so called "butyl rubber" of commerce. Because of my disclosure various other operable elastomeric plastics will be readily apparent to those skilled in the art.

I generally prefer to have the wall thickness of said plastic tube about 2–40 mils (or 5–15 mils), and I generally prefer to have the wall thickness of the elastomeric plastic sleeve about 2–40 mils (or 5–15 mils). However, other wall thicknesses have been found to be operable.

In a preferred embodiment of the collapsible plastic assembly of the above Embodiment B said tube is creased longitudinally (see FIGS. 13 and 14) to facilitate collapsing when contents are removed from a tubular container (dispensing tube) made from said collapsible assembly. It is preferred that there be two creases about 180° from each other as shown in FIGS. 13 and 14.

Figure 13:
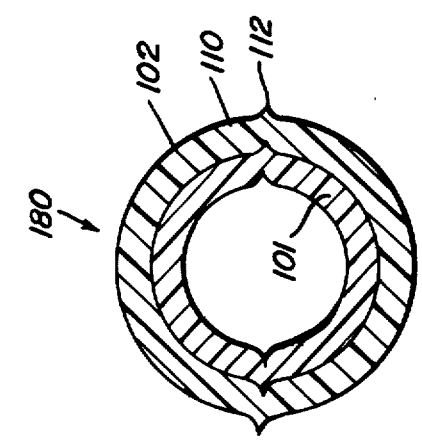
FIG. 13 is a cross section of the collapsible tube of FIG. 8 in which both the heat flowable plastic tube 101 and the tight fitting elastomeric sleeve 102 are creased to facilitate collapsing.

In the embodiment represented by FIG. 13 both the heat flowable plastic tube 101 and the elastomeric sleeve 102 are creased, 110 being the creases in the heat flowable plastic tube and 112 being the creases in the elastomeric sleeve.

Figure 14:
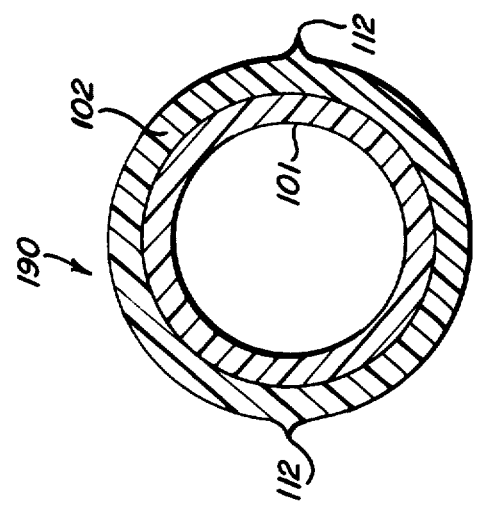
FIG. 14 is a cross section of the collapsible tube of FIG. 8 in which only the tight fitting elastomeric sleeve 102 encasing the heat flowable plastic tube 101 is creased to facilitate collapsing.

In the embodiment represented by FIG. 14 only the elastomeric sleeve is creased, 112 being creases in the elastomeric sleeve.

In another embodiment of my invention as set forth in Embodiment B only the heat flowable thermoplastic tube is creased. However, the appearance of the collapsible assembly will be the same as in FIG. 13 because crease 110 of the creased tube 101 will form a crease 112 in elastomeric sleeve 102.

In another embodiment ("Embodiment C") this invention is directed to collapsible packaging and dispensing tube having a cappable dispensing end and a heat sealable filling end, said collapsible packaging and dispensing tube comprising a cappable dispensing zone (i.e., a cappable end zone) heat sealed to a collapsible plastic tube comprising a laminate of an inner ply and an outer ply, the inner ply being a heat flowable, nonoriented, nonshrunk thermoplastic polymer and the outer ply being a heat flowable oriented shrunk, thermoplastic polymer. The collapsible plastic tube can be creased longitudinally as represented by 110 of FIG. 9, with the creases preferably being 180° apart.

DETAILED DESCRIPTION OF THE INVENTION

It is an object of this invention to provide a collapsible plastic tube.

It is another object of this invention to provide a collapsible plastic tube suitable for packaging and dispensing foodstuff such as mustard paste, horseradish, chutney, mayonnaise and the like.

Still other objects of this invention will, because of my disclosure, be readily apparent to those skilled in the art.

While I prefer to use the above-mentioned plastics (i.e., polyethylene, cellulose acetate, saran, polyvinyl acetate, ethylene-vinyl acetate copolymer, or polyvinyl chloride) to prepare the inner ply of the collapsible tube of the above Summary (and the preferred embodiments thereunder), any extrudable, heat flowing, thermoplastic can be used with excellent results.

While I prefer to use the above-mentioned plastics (i.e., polyethylene, polypropylene, polyester, polystyrene, polyvinyl chloride, Pliofilm, nylon, ethylene-vinyl alcohol copolymer, or acrylonitrile copolymers) to prepare the outer ply of the collapsible tube of the above Summary (and the preferred embodiments thereunder), any heat flowable, orientable, shrinkable thermoplastic can be used with excellent results.

Because of my disclosure various modifications of the procedures recited infra for preparing; (a) the collapsible tube of the above Summary (and the embodiments thereunder); (b) the collapsible tube of the above Embodiment A (and the embodiments thereunder); and (c) the collapsible assembly of Embodiment B (and the embodiments thereunder) will be readily apparent to those skilled in the art.

The instant invention will be better understood by referring to the following specific but nonlimiting examples. It is understood that said invention is not limited by these examples which are offered merely as illustrations; it is also understood that modifications can be made without departing from the spirit and scope of the invention.

EXAMPLE 1

Figure 1:
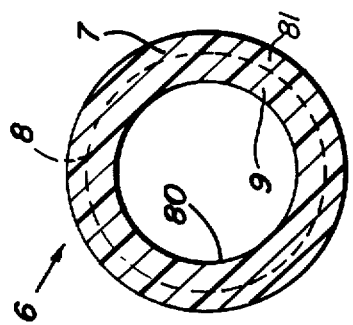
FIG. 1 is a cross section of the collapsible plastic tube described in the above summary.

A collapsible plastic tube (shown as 1 in FIG. 1) comprising a laminate of an inner ply of an extrudable (heat flowable) nonoriented thermoplastic and outer ply of a heat flowable (extrudable), oriented, shrunk plastic was prepared using the apparatus shown in FIGS. 4 and 5.

In this instance, inner ply 2 was made of polyethylene and outer ply 3 was made of nylon.

The collapsible plastic tube was formed by first fabricating inner ply 2 and thereafter running it through a crosshead die and extrusion coating outer ply 3 over the inner ply.

Referring to FIG. 4, there is shown a frame 12 supporting the various pieces of equipment. First extruder 14 formed a tubular extrudate (inner ply 2) of polyethylene which passed through cooling zone 18 and thence to crosshead die 20 of second extruder 22. As ply 2 passed through crosshead die 20, there was extruded around the inner ply an outer ply 3 which was made of nylon. The resulting tubular laminate (or "prelaminate") 10 passed to sizing zone (or chamber) 26 wherein plys 2 and 3 were laminated together to form tubular laminate 11. The tubular laminate 11 from sizing zone 26 passed to blowing zone 28 where it (tubular laminate 11) was blown to orient outer ply 3. The resulting blown tubular laminate 13 was passed to heating zone 30 where it (blown tubular laminate 13) was heated to shrink oriented outer ply 3. The resulting collapsible plastic tube 1 of this invention exit heating zone 30 was cooled to about 30°C in cooling zone 32. The resulting cooled collapsible tube 1 of this invention exit cooling zone 32 can be cut into desired lengths for making container tubes (dispensing tubes) for toothpaste, shaving cream, mustard paste and the like or it can be recovered in lengths ranging from several feet to 50 or 100 or more feet in length.

FIG. 5 shows in detail crosshead die 20 and the initial section of sizing zone or chamber 26. As shown by said FIG. 5, inner ply 2 passed through cross head die 20 and there was extruded thereon (via the annular opening defined by outer die bushing 54 and the outer surface of concentric hollow mandril 56) outer ply 3 to form tubular prelaminate 10 which passed to sizing zone 26 where bushing 52 mechanically sized the laminate and smoothes the outer surface of outer ply 3. The entire sizing zone 26 was under vacuum to cause tubular prelaminate 10 to remain in intimate contact with bushing 52 as the resulting laminate passed through sizing zone 26.

If desired extruder 14 can be designed to crease tube 2 which is formed therein (e.g., two longitudinal creases 180° apart). Also, if desired die 20 can be designed to crease tube 3 which is formed therein (e.g., two longitudinal creases 180° apart).

EXAMPLE 2

A 10 foot portion of the collapsible plastic tube made in Example 1 was cut into sections 4 inches long making a total 30 such sections. One end of each section was fitted (heat sealed) to a cappable end or collar adapted to accept a screw cap, while the other (bottom) end was left open.

EXAMPLE 3

15 of the sections which had screw cap tops attached thereto were filled with ketchup and the open (bottom ends) were heat sealed to form ketchup-filled dispensing tubes.

The screw caps were removed from each of the heat sealed filled tubes and gentle pressure was applied by hand to each to force ketchup therefrom. Then, after about ¼ to ½ of the ketchup had been expelled from the tubes, the pressure was released. In each instance the collapsed portion of the respective tube remained collapsed when the pressure was released, and no air was sucked into the partially empty tube.

EXAMPLE 4

The general procedure of Example 3 was repeated, but in this instance the procedure was modified by using toothpaste rather than ketchup to fill the tubes.

In no instance did the tubes expand when the pressure used to force toothpaste therefrom was released. Neither was air sucked into the partially empty tubes when such pressure was released.

EXAMPLE 5

A collapsible plastic tube (shown in FIG. 1) comprising a laminate of an inner ply of an extrudable nonorientable plastic and outer ply of a heat flowable, oriented, shrunk plastic was prepared using the method illustrated in FIG. 6.

Strip 3 of oriented plastic was wound around tube 2 of nonorientable plastic to form a coating thereon. In this instance strip 3 was a strip of nylon having a thickness of 5 mils and tube 2 was a polyethylene tube having a wall thickness of 10 mils. Strip 3 was maintained under tension as it was wound (spiralled and lapped in a conventional manner) around tube 2, while heat was applied to strip 3 via heat source 60 (a heat lamp, a hot surface radiating heat, an electric heater, a flame, or the like could be used) to soften strip 3 so that strip 3 would adhere to tube 2 which comprised the inner ply of the laminated tube. The application of heat and tension to strip 3 caused the plastic comprising strip 3 to become oriented. Heat was applied to the surface of resulting laminated tube 65 via heat source 70 to shrink the oriented plastic comprising the outer ply of laminated tube 65 to form collapsible plastic tube 1 comprising a laminate of an inner ply of an extrudable nonorientable plastic and an outer ply of a heat flowable oriented shrunk plastic.

If desired, a creased tube 2 can be used (e.g., a tube having longitudinal creases 180° apart) to prepare the laminate. In this instance the final laminate will appear in cross section as does the laminate of FIG. 10.

EXAMPLE 6

The general procedure of Example 2 was repeated. However, in this instance the procedure was modified by replacing the collapsible plastic tubes prepared in Example 1 with those prepared in Example 5.

EXAMPLE 7

The general procedure of Example 3 was repeated. However, in this instance the procedure was modified by substituting sections of collapsible plastic tubing with screw caps prepared in Example 6 for those prepared in Example 2. The results were indistinguishable from those obtained in Example 3.

EXAMPLE 8

The general procedure of Example 4 was repeated. However, in this instance sections of collapsible plastic tubing prepared in Example 6 were substituted for those prepared in Example 2, and shaving cream was substituted for toothpaste.

In no instance did the plastic tubes expand or draw air into themselves when; (a) shaving cream was expelled therefrom; and (b) the pressure used to force the cream out was released.

EXAMPLE 9

Figure 2:
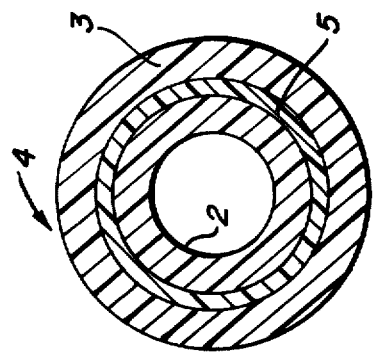
FIG. 2 is a cross section of a collapsible plastic tube comprising a laminate of an inner ply 2 of an extrudable nonoriented plastic and an outer ply 3 of a heat flowable oriented shrunk plastic with a bonding agent 5 between said plys.

A collapsible plastic tube (shown in FIG. 2) comprising a laminate of an inner ply of a heat flowable nonorientable plastic and outer ply of a heat flowable oriented shrunk plastic with a bonding agent between the two plies was prepared using the method shown in FIG. 7.

A strip of bonding agent 5 (in this instance a strip of ethylene-vinyl acetate copolymer having a thickness of 0.5 mils) was spiralled and lapped in a conventional manner around tube 2 of nonoriented plastic to form a coating 61 of bonding agent 5 thereon. Strip 3 of plastic was wound around the coating 61 of bonding agent to form a coating or oriented plastic thereon. In this instance strip 3 was a strip of nylon having a thickness of 5 mils and tube 2 was a polyethylene tube having a wall thickness of 10 mils. Strip 3 was maintained under tension as it was wound (spiralled and lapped in a conventional manner) around the bonding agent 5 coating tube 2 while heat was applied to strip 3 via heat source 60. The application of heat and tension to strip 3 caused strip 3 to become oriented. Heat was applied to the surface of resulting laminated tube 75 via heat source 70 to shrink the oriented plastic comprising the outer ply of laminated tube 75 to form collapsible plastic tube 4 comprising a laminate of an inner ply of an extrudable nonorientable plastic 2 and an outer ply of a heat flowable oriented shrunk plastic 3 with a bonding agent 5 therebetween.

If desired, a creased tube 2 (e.g., a tube having longitudal creases 180° apart) can be used to prepare the laminate. In this instance the laminate, when viewed in cross section, will have the appearance of the laminate of FIG. 11.

EXAMPLE 10

The general procedure of Example 2 was repeated. However, in this instance the procedure was modified by replacing the collapsible plastic tube prepared in Example 1 with that prepared in Example 9.

EXAMPLE 11

The general procedure of Example 3 was repeated. However, in this instance the procedure was modified by substituting sections of collapsible plastic tubing with screw caps prepared in Example 10 for those prepared in Example 2. The results were indistinguishable from those obtained in Example 3.

EXAMPLE 12

The general procedure of Example 4 was repeated. However, in this instance sections of collapsible plastic tubes with screw caps prepared in Example 10 were substituted for those prepared in Example 2, and shaving cream was substituted for toothpaste.

In no instance did the plastic tubes expand or draw air into themselves when; (a) shaving cream was expelled therefrom; and (b) the pressure used to force the cream out was released.

EXAMPLE 13

Figure 3:
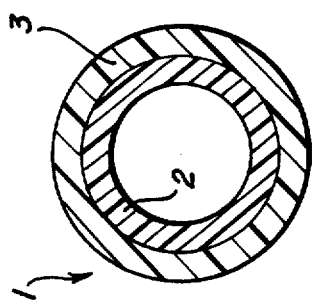
FIG. 3 is a cross section of a collapsible plastic tube comprising a heat flowable oriented plastic tube having a nonshrunk (or unshrunk) inner portion 9 and a shrunk outer portion 7.

A collapsible plastic tube (shown in FIG. 3) comprising an oriented plastic tube having an unshrunken inner portion and a shrunken outer portion was prepared by the following procedure:

A tube having an inside diameter of about one inch and a wall thickness of 10 mils was prepared by extruding nylon using a conventional technique designed to prepare a one ply tube. Before cooling the tube was passed through a blowing zone to orient the nylon comprising said tube. The resulting oriented tube was cooled and passed through a heating zone at such rate that only outer portion 81 of tube 6 of FIG. 3 was heated, thereby to shrink outer portion 81 of tube 6 while leaving inner portion 9 of tube 1 unshrunken. In this run shrunken outer portion 8 of tube 6 extended inward from outer surface 7 through about ¼ - ⅓ of wall thickness of tube 6 as indicated by dotted line 8 while the inner portion of tube 6 (that portion extending inward from dotted line 8 to inner surface 80 comprised about ⅔ - ¾ of the wall thickness of tube 6) remained unshrunken.

If desired, the tube can be creased longitudinally (e.g., two creases at 180° to each other as shown at 110 in FIG. 12) by using a die on the extruder which is designed to produce such creased tube. Creasing has been found to enhance the collapsible characteristics of packaging/dispensing tubes.

EXAMPLE 14

The general procedure of Example 2 was repeated. However, in this instance the procedure was modified by substituting sections of collapsible plastic tubing with screw caps prepared in Example 14 for those prepared in Example 2. The results were indistinguishable from those obtained in Example 3.

EXAMPLE 15

The general procedure of Example 3 was repeated. However, in this instance the procedure was modified by substituting sections of collapsible plastic tubing with screw caps prepared in Example 14 for those prepared in Example 2. The results were indistinguishable from those obtained in Example 3.

EXAMPLE 16

The general procedure of Example 4 was repeated. However, in this instance sections of collapsible plastic tubing with screw caps prepared in Example 15 were substituted for those prepared in Example 2, and shaving cream was substituted for toothpaste.

In no instance did the plastic tubes expand or draw air into themselves when; (a) shaving cream was expelled therefrom; and (b) the pressure used to force the cream out was released.

EXAMPLE 17

One end of a nonoriented nonshrunk polyethylene tube having a wall thickness of 20 mils, a diameter of about 1¼ inch, and a length of 6 inches was fitted (heat sealed) to a cappable end or collar adapted to accept a screw cap while the other end was left open. A screw cap was applied to be cappable end and the thus capped tube was fitted into a smuggly fitting elastomeric (rubber) sleeve having a wall thickness of 25 mils and a length of 5½ inches. The tube was filled with shaving cream by adding the shaving cream via the open end. After filling the tube, the open end was heat sealed.

The screw cap was removed and gentle pressure was applied by hand to force shaving cream from the tube. After about ¼ of the shaving cream had been expelled from the tube, the pressure was released. The collapsed portion of the tube remained collapsed when the pressure was released and no air was sucked into the partially empty tube.

If desired, the nonoriented nonshrunk tube can be creased longitudinally (e.g., two creases at 180° to each other as shown at 110 in FIG. 13) by using an extruder having a die designed to produce such creased tube.

Also, if desired, the elastomeric sleeve can be creased longitudinally (e.g., two creases as shown at 112 in FIGS. 13 and 14). This can be done by producing the elastomeric sleeve on an extruder having a die designed to produce such creased elastomeric sleeve.

FIG. 15 shows a filled, collapsible, cappable packaging and dispensing tube of my invention. It is made from a collapsible tube of my invention. One end of a section of collapsible tube of my invention was heat sealed to a cappable end or collar 204 having a threaded spout 203 onto which cap 201 can be screwed. The other end of the section of collapsible tube was heat sealed after filling the capped tube with mustard, ketchup, or the like. Obviously, a snap closure cap (and a spout designed to accept the snap closure cap) can be substituted for its equivalent, the screw cap (and threaded spout) of FIG. 15.

FIG. 16 shows a collapsible cappable packaging and dispensing tube of my invention before heat sealing the filling end 206 thereof.

As used herein, the term "mil" means 0.001 inch; thus, 0.1 mil is 0.0001 inch and 4 mils is 0.004 inch.

As used herein, the term "oriented" as applied to a thermoplastic means a thermoplastic whose molecules are so aligned that, upon heating to the proper temperature, shrinking occurs. Because of my disclosure one skilled in the art can readily determine the proper temperature for use where orienting or shrinking any particular thermoplastic material.

As used herein, the term "nonoriented" as applied to a thermoplastic means a thermoplastic which upon heating does not shrink.

As used herein, the term "shrunk" as applied to a thermoplastic tube means that a reduction in length of one dimension (preferably the annular direction) of the thermoplastic tube has occurred.

I claim:

1. A collapsible packaging and dispensing tube having a cappable dispensing end and a heat sealable filling end, said collapsible packaging and dispensing tube comprising a cappable dispensing means heat sealed to a collapsible plastic tube comprising a single ply, heat flowable, oriented plastic tube having an unshrunk inner portion and a shrunk outer portion.

2. The collapsible packaging and dispensing tube of claim 1 in which the collapsible plastic tube has two longitudinal creases about 180° from each other.

3. The collapsible packaging and dispensing tube of claim 1 in which the single ply, heat flowable, oriented plastic tube having an unshrunk inner portion and a shrunk outer portion is constructed of nylon.

4. The collapsible packaging and dispensing tube of claim 1 in which the single ply, heat flowable, oriented plastic tub having an unshrunk inner portion and a shrunk outer portion is constructed of polypropylene.

* * * * *